Feb. 10, 1970 W. W. McFARLAND ET AL 3,494,534

TV TUBE BOX

Filed June 17, 1968 6 Sheets-Sheet 1

Feb. 10, 1970 W. W. McFARLAND ET AL 3,494,534

TV TUBE BOX

Filed June 17, 1968 6 Sheets-Sheet 2

Feb. 10, 1970 W. W. McFARLAND ET AL 3,494,534

TV TUBE BOX

Filed June 17, 1968 6 Sheets-Sheet 6

United States Patent Office 3,494,534
Patented Feb. 10, 1970

3,494,534

TV TUBE BOX

William W. McFarland, Wooster, and Harry D. Wintringer III, Shelby, Ohio, assignors to International Paper Company, New York, N.Y., a corporation of New York Continuation-in-part of application Ser. No. 686,031, Nov. 28, 1967. This application June 17, 1968, Ser. No. 744,267
Int. Cl. B65d 85/42
U.S. Cl. 229—14 10 Claims

ABSTRACT OF THE DISCLOSURE

A paperboard container for shipping and storing fragile articles, more particularly television picture tubes, which includes an outer container, a packaging insert spacer, having upstanding tabs thereon, on the bottom wall of the container and extending horizontally substantially from one side wall of the container to the other and from one end wall to the other, packaging inserts in the container extending from the spacer to the container top with the lower edge of the insert in engagement with the tabs, and a plurality of horizontally disposed, vertically spaced packaging supports, spaced one above the other in each packaging insert, the packaging supports have cut-outs for engaging a side of the article and for supporting the article out of engagement with the container bottom, the tabs on the spacer engaging the lowermost packaging support and spacing the support therebetween and from opposite walls of the insert.

BACKGROUND OF THE INVENTION

This application is a continuation-in-part of application Ser. No. 686,031, filed Nov. 28, 1967 now abandoned, and relates to containers and, more particularly, to paperboard containers for shipping and storing television picture tubes and similar fragile articles.

Television picture tubes, especially larger picture tubes, are bulky and fragile. Such tubes have a glass face, a glass or metal throat or body, and a glass or metal neck. Because of the vacuum in the tube, if cracked or broken, the tube may implode, causing the electronic unit of the tube and the glass to fly around with considerable force just as if the tube had exploded. Thus, injury and considerable damage can occur and care is therefore required in the handling, shipping and storage of such tubes.

Most television tubes are made, or assembled, on a production line and are moved from the picture tube production line to the place where television sets are assembled. In many instances, the picture tubes and the television sets are not assembled in the same plant. Thus, the picture tubes must be shipped from one plant to the other, in some cases over considerable distance, by, for example, truck or railroad. After the tubes are made, or assembled, and before they are shipped, the tubes must be stored. Likewise, when received at the assembly plant, the tubes must be stored until assembled into sets.

The picture tubes must, of course, be protected during storage and shipment, and during handling which, in most plants, is performed with lift truck equipment. To economize in space in shipment and storage, it is desirable that the protected tubes be stacked, one on the other.

In protecting the picture tubes during shipment and storage, it is, of course, important that the protection provided not only protects the tube against damage during handling, shipment and storage but, at the same time, not add appreciable to the cost of the tube. Such cost is not only affected by the cost of the container but also by container weight, container storage, labor in assembling or erecting the container and the labor and time involved in packing and unpacking the picture tubes.

SUMMARY OF THE INVENTION

The container of the instant invention includes an outer box, or carton, cut, and scored or embossed from a sheet of paperboard, such as, corrugated paperboard, a packaging insert spacer having upstanding tabs thereon, packaging inserts which, when in place in the carton, are engaged and held in position by the tabs, and packaging supports which, when in place in the inserts and in engagement with the picture tubes hold and lock the tubes in place in the container. The container is covered with a top or lid.

Each of the container parts, the blanks from which the outer box is assembled, or erected, the packaging insert spacer, the packaging inserts, the packaging supports, and the top, are cut from paperboard sheets, such as, corrugated paperboard. The parts are cut and, where required, scored or embossed and the parts shipped and stored flat. The flat parts can be stacked one on the other. This, of course, minimizes shipping and storage costs of the container parts.

When the container of the instant invention is required, the various parts are withdrawn from the stack, folded on the prescored or embossed fold lines, stapled, glued, or fastened with tape, and assembled. The parts are so arranged that, when the container is assembled, various portions of the respective parts are in contact with each other, forming supporting walls of double paperboard thickness throughout the assembled container. This double wall thickness increases the strength and rigidity of the container and provides added protection to the packaged picture tubes.

DESCRIPTION OF THE DRAWINGS

The invention will be apparent and better understood from the following description of the preferred embodiment and the accompanying drawing in which.

Figure 1:
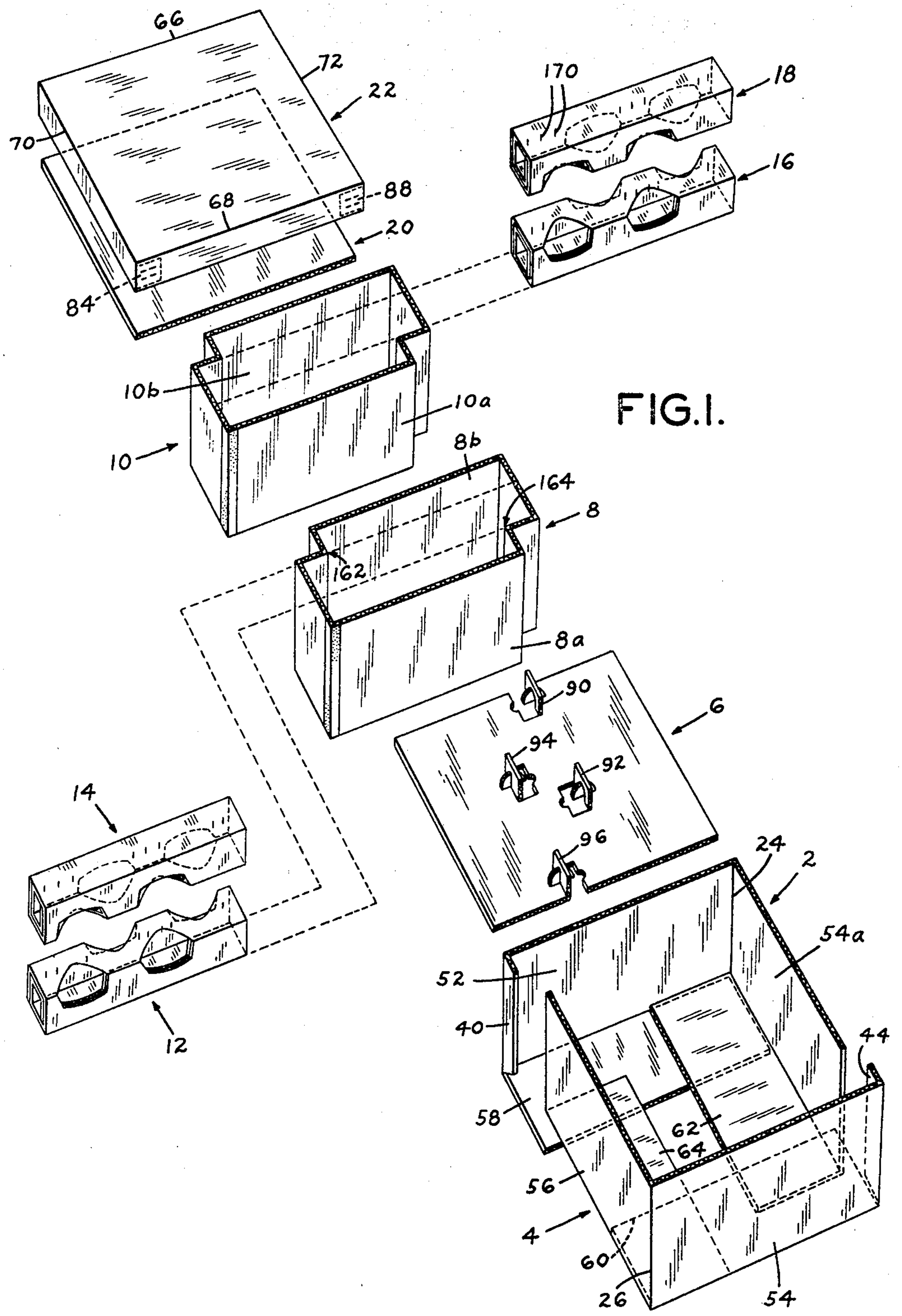
FIGURE 1 is an exploded, perspective view of the container of the instant invention.

Referring first to FIGURE 1, the container of the instant invention is made up of an outer carton erected from blanks, generally designated 2, 4, a packaging insert spacer, generally designated 6, packaging inserts, generally designated 8, 10, packaging supports, generaly designated 12, 14, 16, 18, a cover insert, generally designated 20, and a cover generaly designated 22, all cut and scored, or embossed, from paperboard material, such as, corrugated paperboard and folded and assembled or erected in the manner that will be described.

Figure 3:
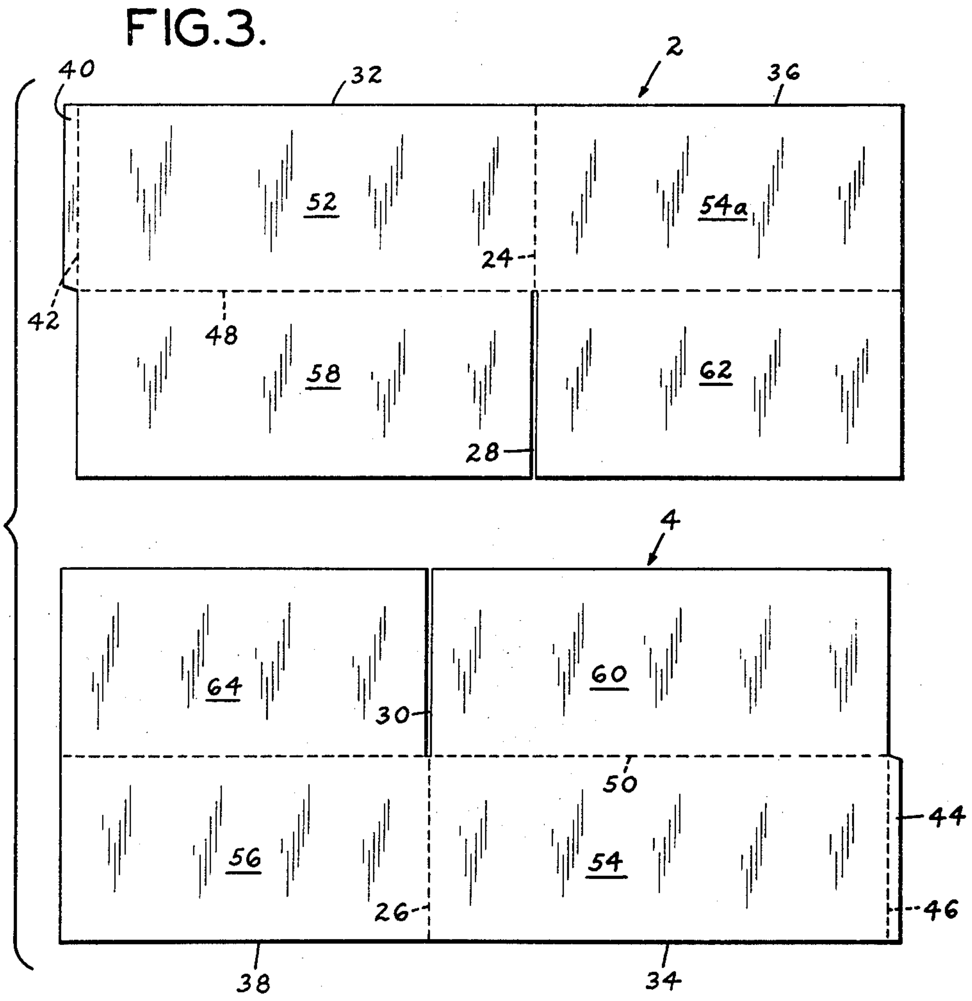
FIGURE 3 is a plan view of the outer box blanks.

As best shown in FIGURE 3, outer carton blanks, 2, 4, which arre identical, are divided, respectively, by vertical scored, or embossed, lines 24, 26 and slots 28, 30, into end wall panels 32, 34 and side wall panels 36, 38. Side seam flap 40 is hingedly connected to one end of end wall panel 32 by scored, or embossed, line 42 and side seam flap 44 is hingedly connected to one end of end wall panel 34 by scored, or embossed, line 46. End wall panels 32, 34 and side wall panels 36, 38 are divided by horizontal scored, or embossed lines, 48, 50 into vertical end walls 52, 54, vertical side walls, 54, 56, end wall bottom flaps 58, 60 and side wall bottom flaps 62, 64.

Figure 4:
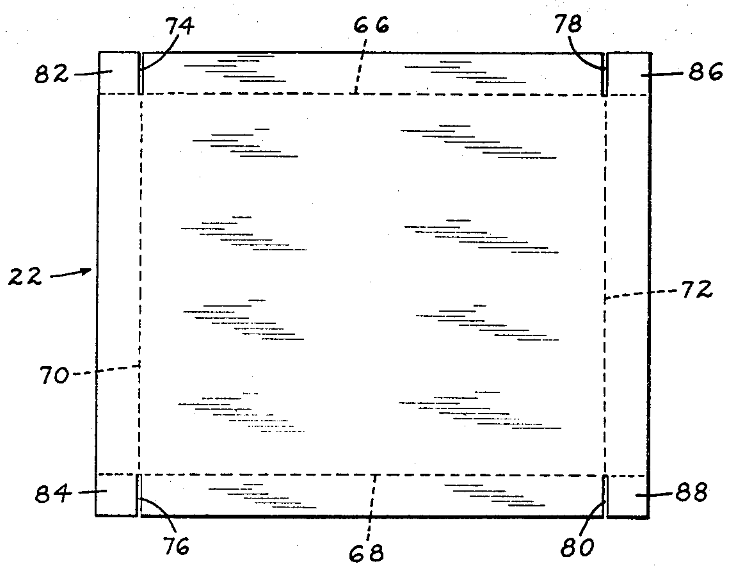
FIGURE 4 is a plan view of the container top blank.

Cover 22, as shown in FIGURE 4, is scored, or embossed, on lines 66, 68 and 70, 72 and the opposite ends of scored lines 70, 72 are slotted at 74, 76, 78, 80 so that, when the edges of cover 22 are folded downwardly along the scored fold lines, tabs 82, 84, 86, 88 can be folded inwardly and fastened, by glue or staples, to the adjoining downwardly folded edge.

Figure 5:
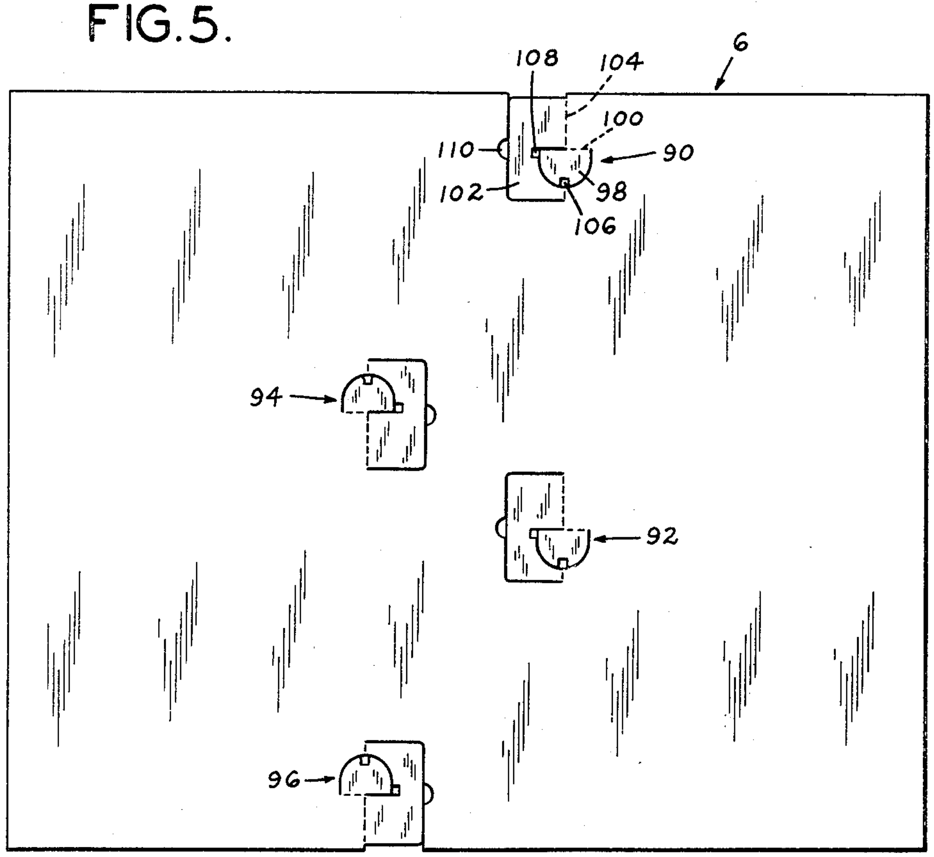
FIGURE 5 is a plan view of the packaging insert spacer blank.

Referring next to FIGURE 5, packaging insert spacer 6, is cut from a sheet of paperboard, such as corrugated paperboard, so that, in the plane of the sheet and lying flat therein before the insert spacer is assembled or erected, there are a plurality of tabs, generally designated 90, 92, 94, 96, each having an arcuate tab member 98, hingedly connected along fold line 100 to the sheet, and a rectangular tab member 102, hingedly connected along fold line 104 to the sheet. Arcuate tab member 98 is notched at 106 and rectangular tab member 102 is notched at 108 so that when erected, notches 106 and 108 will interlock to hold the tab in its erected position. A finger hole 110 is cut into the sheet so that, in erecting insert spacer 6, the paperboard material in the finger hole can be pushed out to allow the tab to be erected.

Figures 6, 7, 8, 9:
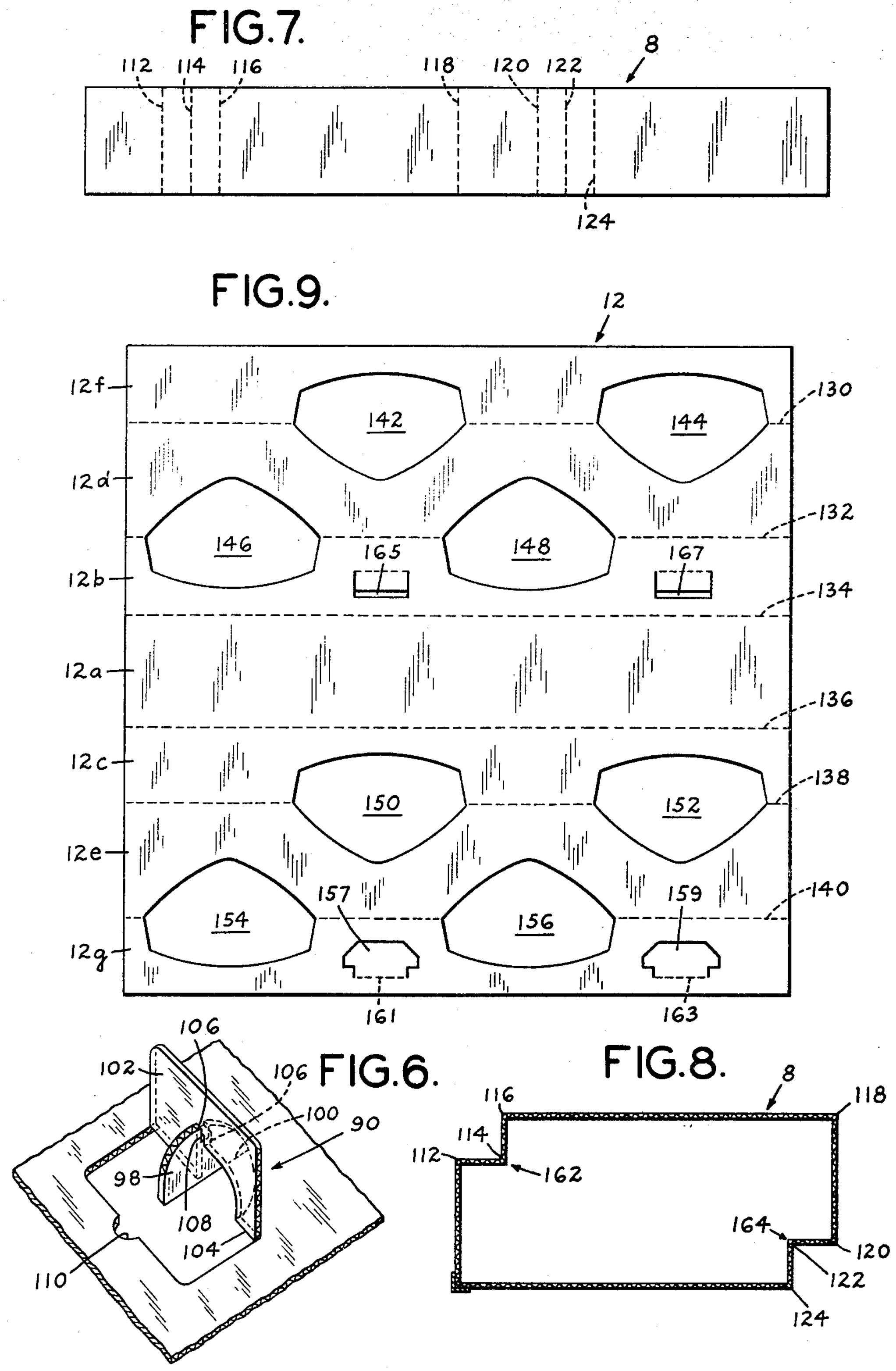
FIGURE 6 is an enlarged perspective view of one of the tab portions of the packaging insert spacer blank of FIGURE 5 showing the tab erected.
FIGURE 7 is a plan view of the packaging insert blank.
FIGURE 8 is a top view of the assembled, or erected, packaging insert of FIGURE 7.
FIGURE 9 is a plan view of the packaging support blank.

Packaging inserts 8, 10, are cut identical as is shown in FIGURE 7, with respect to packaging insert 8, each insert is cut and scored or embossed along fold lines 112, 114, 116, 118, 120, 122, 124 so that, when folded along such scored or embossed fold lines and erected, as will be later described, the packing inserts can be formed into the required shape.

Referring next to FIGURE 9, packaging supports 12, 14, 16, 18 are cut identically from the paperboard sheet and are scored or embossed along fold lines 130, 132, 134, 136, 138, 140. In cutting supports 12, 14, 16, 18 from the sheet, the portions 142, 144, 146, 148, 150, 152, 154, 156, are stamped or cut out of the sheet. These cut out portions are shaped so that, as will be later described, when the container is erected and assembled and the articles to be stored or shipped, in the described embodiment television picture tubes, are positioned in the container, the marginal edges of the cut out portions receive and engage the articles. Tabs 157, 159 are cut in supports 12, 14, 16, 18 and are hinged to the support along fold lines 161, 163 and, when the supports are assembled or erected, are inserted into slots 165, 167 also cut in supports 12, 14, 16, 18 for purposes more apparent hereinafter.

The various parts of the container, after they are cut from the sheet paperboard sheet, are flat and may be shipped to, and stored at, the place where the containers are to be used while they are flat. Thus, the various parts of the container can be shipped and stored economically and in the minimum of spaces. If desired, however, the containers can, of course, be assembled or erected as the various parts are cut and scored or embossed and the assembled container can be shipped, assembled, to the point where the container is to be used.

Figure 2:
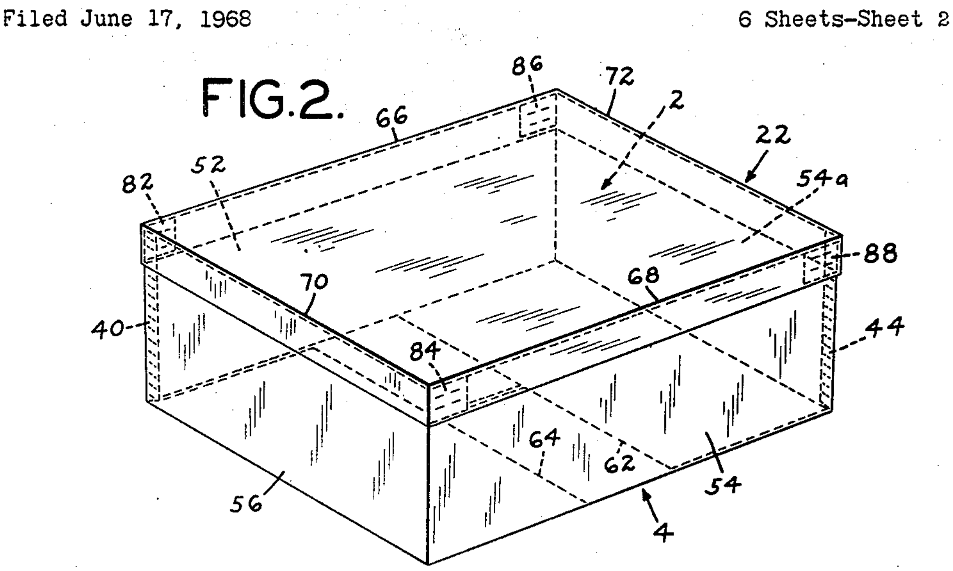
FIGURE 2 is a perspective view of the outer box, or carton.

Referring now to FIGURES 1, 2 and 3, to erect the container, outer carton blanks 2, 4 are folded along scored fold lines 24, 26, 42, 46 and side seam flaps 40, 44 are fastened by staples, glue or adhesive to vertical side walls 56, 54, respectively. End wall bottom flaps 58, 60 and side wall bottom flaps 62, 64 are then folded inwardly toward the center of the container and are stapled, glued or secured with an adhesive to form the bottom of the container. Packaging insert 6 is next assembled or erected and placed in the bottom of the container.

Before placing packaging insert 6 in the bottom of the container and referring to FIGURES 5 and 6, each of the tabs 90, 92, 94, 96 is erected by first bending the arcuate tab member 98 along fold line 100 upwardly to a vertical upright position relative to the plane of packaging insert 6 and by then bending rectangular tab member 102 along fold line 104 upwardly to a vertical upright position relative to the plane of packaging insert 6 and by then bending rectangular tab member 102 along fold line 104 upwardly to a vertical upright position relative to the plane of packaging insert 6 and notch 106 on the tab 98 is locked with notch 108. With all of the tabs erected, packaging insert 6 and notch 106 on the tab 98 is locked with notch 108. With all of the tabs erected, packaging insert 6 is then placed on the bottom of the container over secured flaps 58, 60, 62, 64. The peripheral edges of packaging insert 6 coincide with the inner surfaces of vertical end walls 52, 54 and vertical side walls 56, 58, and, with the ends of the flaps, keep the assembled container relatively square. Packaging insert 6, with its edges in contact with the vertical walls cannot, of course, shift relative to the side walls. Next, the packaging inserts 8, 10 are assembled or erected and placed in the container.

Referring now to FIGURES 1, 7 and 8, packaging spacers 8, 10 are identical and, therefore, only the assembly of spacer 8 will be described, it being understood, however, that spacer 10 is assembled in like manner. Spacer 8 is folded along fold lines 112, 114, 116, 118, 120, 122, 124 so that, at the opposite corners there is a stepped corner 162, 164. The abutting ends of spacer 8 are connected by an adhesive tape. The erected insert spacers 8, 10 are then placed in the container.

In placing the erected spacers 8, 10, in the container, the bottom edge of the spacers rest on the upper surface of insert 6. Vertical wall 8_a_ of spacer 8 is in contact with vertical end wall 54 and is held in position against end wall 54 by the engagement of the lower end of wall 8_a_ with the end of rectangular tab 102 of tab 96, the lower end of wall 8_a_ being engaged between the end wall of tab 102 and vertical end wall 54. In like manner, vertical wall 10_b_ of insert spacer 10 is held in position against end wall 52 by the engagement of the lower end vertical wall 10_b_ with the end of rectangular tab 102 of tab 90.

Vertical wall 8_b_ of insert spacer 8 and vertical wall 10_a_ of insert spacer 10 are in abutment with each other and, at their lower end, are in engagement with the ends of rectangular tab 102 of tabs 92, 94. Thus, the lower ends of vertical walls 8_b_, 10_a_ are clamped between the tab ends. Packaging supports 12, 14, 16, 18 are next assembled, or erected, and packaging supports 12, 16 are placed in spacers 8, 10, respectively, so that, at their opposite ends, the vertical side walls of the packaging supports engage stepped corners 162, 164 of spacers 8, 10, for reasons more fully explained later herein.

Packaging supports 12, 14, 16, 18 are identical and are assembled or erected in the same manner. Hence, only the assembly of support 12 is described, it being understood that supports 14, 16, 18 are assembled in the same manner.

Figure 10:
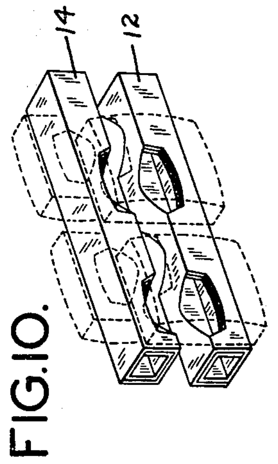
FIGURE 10 is a perspective view of the assembled, or erected, packaging supports of FIGURE 9, showing the supports in engagement with the picture tubes, the picture tubes being shown in phantom.

Referring now to FIGURES 1, 9 and 10, support 12 is folded along scored, or embossed, lines 130, 132, 134, 136, 138, 140 so that each section is at right angle, or 90°, to its adjoining sections. Section **12*a*, between fold lines 134, 136 forms the bottom of the support and, as will be described, is the only section which, after the support is assembled, remains of single thickness. Sections 12*b* and 12*g* and 12*c* form, when the support is folded and assembled, vertical walls of double thickness, at the opposite sides of section 12*a*, and sections 12*d* and 12*e* form a double thick top wall of the support. The support is held in its erected or assembled position by binding tabs 157, 159 along fold lines 161, 163 and by inserting the tabs into slots 165, 167. Rather than employing tabs and slots, the support may be held erected or assembled by, for example, staples 170** (FIG. 1), or may be glued or secured with adhesive tape.

Figure 13:
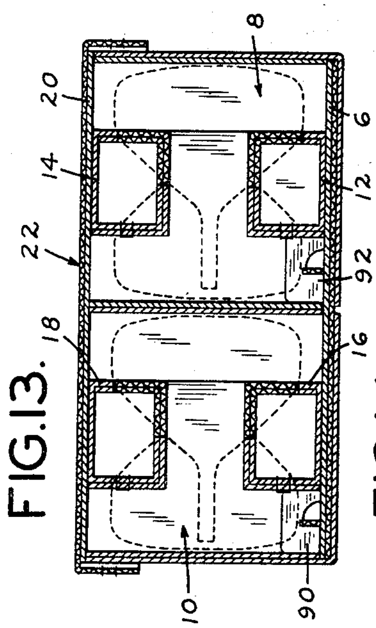
FIGURE 13 is a cross-sectional view taken at 13—13, FIGURE 11.
Figure 14:
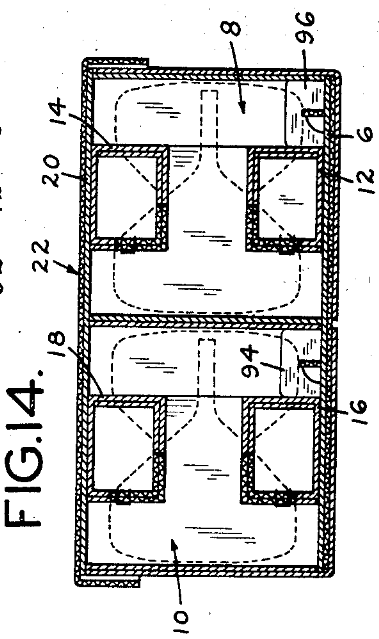
FIGURE 14 is a cross-sectional view taken at 14—14, FIGURE 11.
Figure 11:
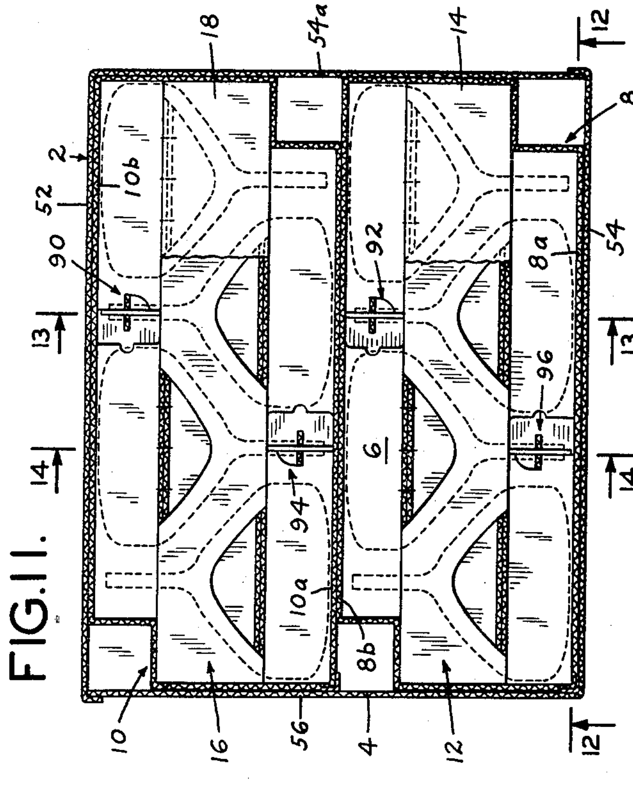
FIGURE 11 is a top plan view, in section, of the assembled container in which the picture tubes are shown in phantom.
Figure 12:
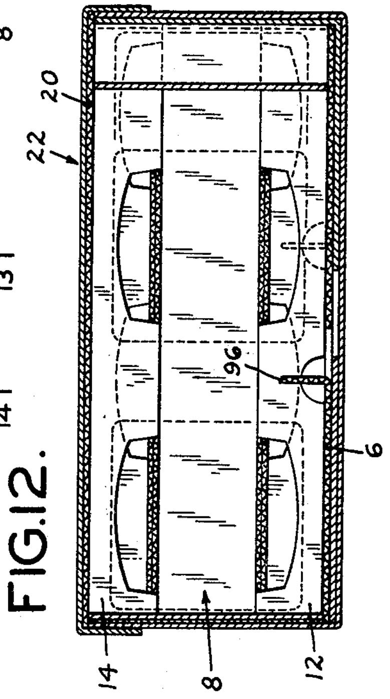
FIGURE 12 is a cross-sectional view taken at 12—12, FIGURE 11.
Figure 15:
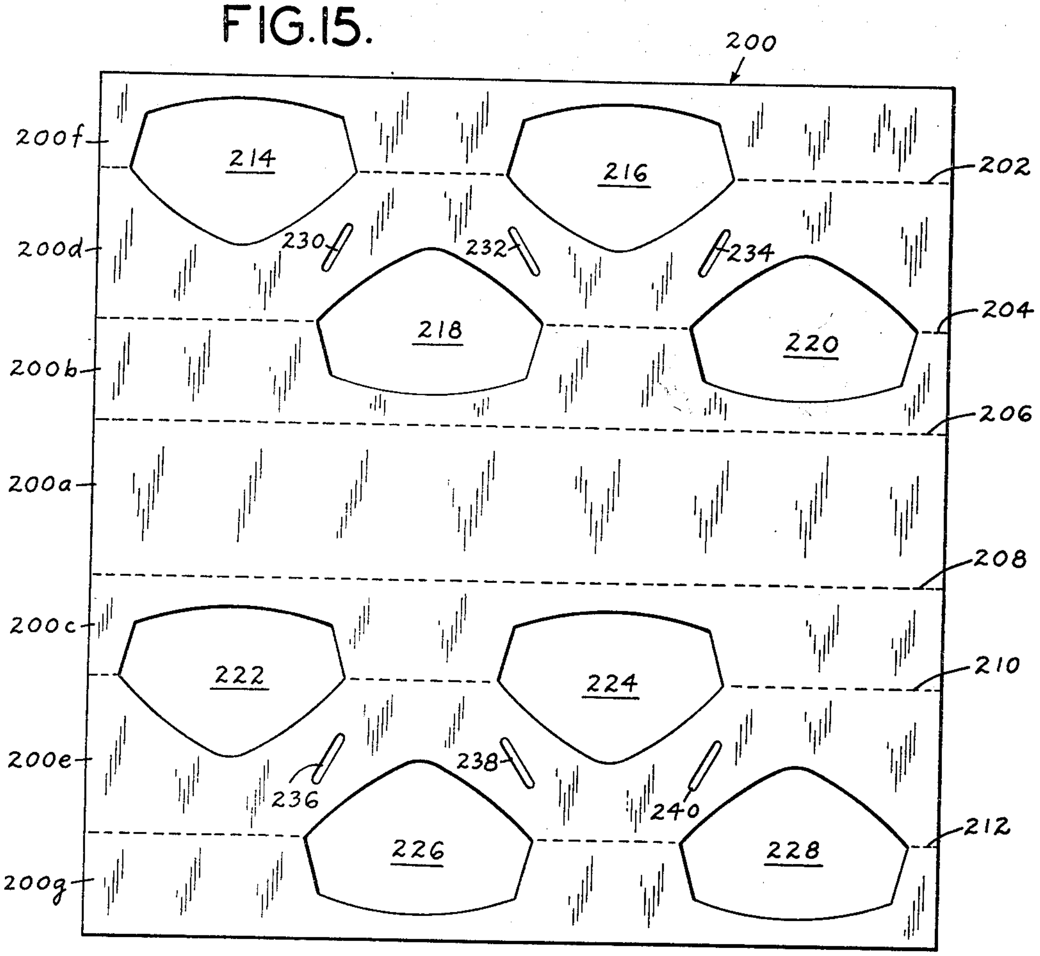
FIGURE 15 is a plan view of a modified packaging support blank.

Packaging supports 12, 16, after the supports have been assembled, are set into packaging inserts 8, 10, respectively, with the cut-outs facing in the opposite directions and upwardly. The bottom section **12*a* of supports 12, 16 rests on insert spacer 6 and, as best shown in FIGURES 1 and 11, at the opposite ends of the supports, the side walls of the supports are in contact with the sides of corners 162, 164 of inserts 8, 10, respectively. Referring to FIGURES 11, 13, and 14, the side walls of supports 12, 16 engage the end wall of rectangular tabs 102 on insert spacer 6. Thus, supports 12, 16 are held in position in the container by corners 162, 164 and the end wall of the rectanglar tabs 102**. This is important, as will be later apparent, because it prevents movement of the supports relative to the container.

With supports 12, 16 in locked position, the container, now partially assembled, is ready to receive the picture tubes.

The container, in the illustrated embodiment, is for eight picture tubes, it being understood, however, that the container can be of any size to receive any number of picture tubes, either side-by-side or, side-by-side and vertically.

Each picture tube, as it is positioned in the container, is rested in one of the cut-outs in the packaging support. In the illustrated embodiment, each support 12, 16, receives four tubes, two of which face in one direction and the other two in the opposite direction. The cut-out in the support forms a cradle for the tube and the tube is rested in this cradle. Thus, there are no tabs, flaps, or the like, to open or close as the tube is positioned in the container and the tube can be placed in the container with minimum difficulty.

After the tubes are in the container, packaging supports 14, 18 are placed on top of the tubes with the cut-out portions of the supports in engagement with the respective tubes. At the opposite ends of the supports, the side walls of the supports are in engagement with corners 162, 164. Cover insert 20 is placed over the open top and cover 22 is then placed on the container. The cover may be secured with straps, staples or tape.

As is best shown in FIGURES 13 and 14, when assembled with the tubes in place and the cover on the container, the picture tubes are held in horizontal position in the container by the supports 12, 14, 16, 18 and are prevented from shifting or moving in the container during shipping and movement of the container. The bottom of the container is of three paperboard thicknesses and all of the vertical walls of the container are of double thickness. Thus, the container can be lifted and moved with lift truck equipment and the containers can be stacked, one on the other. The tubes are spaced from the bottom and top walls of the container and, because of the double thickness of the vertical container walls, loads applied to the container from the top and bottom and not applied to the tubes. Furthermore, the electronic units in the tube necks are spaced from vertical walls and these units, otherwise easily damaged, are protected.

Referring now to FIGURES 15 to 18, modified packaging support blank, generally designated 200, is similar to packaging supports 12, 14, 16, 18 and is cut from a paperboard sheet and scored or embossed along fold lines 202, 204, 206, 208, 210 and 212. Portions 214, 216, 218, 220, 222, 224, 226 and 228 are stamped or cut out of the sheet and, as in packaging supports 12, 14, 16, 18, are shaped so that, when packaging support 200 is erected and assembled, the articles to be stored or shipped are positioned in the container, the marginal edges of the cut out portions receive and engage the articles. In addition to the stamped or cut out portions, slots 230, 232, 234, 236, 238 and 240 are stamped or cut out of the sheets.

Packaging support spacer, generally designated 250 is, likewise, cut out of a paperboard sheet and scored or embossed along lines 252, 254, 256, 258. Tabs 260, 262, 264, 266, 268 extend downwardly at one side from the main body of support spacer 250 and cut out portions 270, 272 extend inwardly from the other edge of the main portion.

Packaging support blank 200 is folded along scored, or embosesd, lines 202, 204, 206, 208, 210, 212 so that each section is at right angle, or 90°, to its adjoining sections. Section **200*a*, between fold lines 206, 208, forms the bottom of the assembled support. Sections 200*b* and 200*g* and 200*c* form, when the support is folded and assembled, vertical walls of double thickness at the opposite sides of section 200*a*, and sections 200*d* and 200*e* form a double thick top wall of the support. When the support is folded and erected, slots 230 and 236 and slots 232 and 238, and 234 and 240** coincide.

Figures 16, 17, 18:
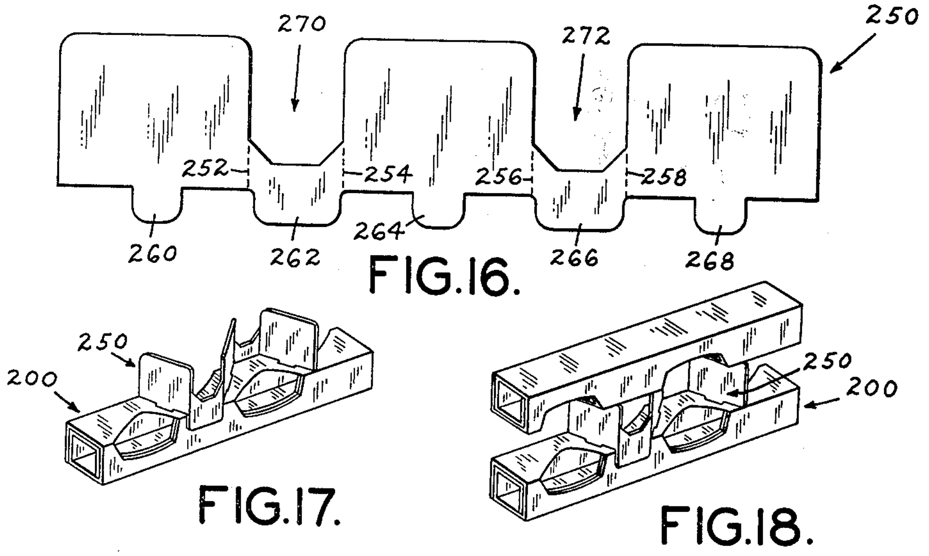
FIGURE 16 is a plan view of a pckaging support spacer blank for use with the packaging support blank of FIGURE 15.
FIGURE 17 is a perspective view of the assembled, or erected, packaging support and packaging support spacer of FIGURES 15 and 16, showing the support and support spacer assembled for receiving tubes.
FIGURE 18 is a view similar to FIGURE 17 and showing the second packaging support assembled and in position.

Packaging support spacer blank 250 is folded along fold lines 252, 254, 256, 258. Tab 260 of packaging support spacer 250 is inserted into coinciding slots 230, 236 of the assembled and erected packaging support blank 200 and tabs 264, 268 are inserted into coinciding slots 232, 238, 234 and 240, respectively. Tabs 260, 264, 266 hold packaging support blank 200 in its erected or assembled position, tabs 262 and 266 extending downwardly outside of the opposite side walls of the erected packaging support blank, as shown in FIGURES 17 and 18. The main portions of packaging support spacer blank 250 form protective barriers between the tubes, when the tubes are placed in the assembled container and the neck of the respective tubes nest and are supported in cutout portions 270, 272.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention.

What is claimed is:

1. In combination, a container having opposed side and end walls and a bottom wall hingedly joined along vertical and horizontal fold lines and forming a rectangular receptacle closed at the bottom and open at the top, a package insert spacer on the bottom wall of said container extending horizontally substantially from one of said opposed side walls to the other of said side walls and from one of said opposed end walls to the other of said end walls, said spacer having projecting upwardly therefrom toward the open top of said container a plurality of spaced tabs, packaging inserts in said container having opposed side and end walls hingedly joined along fold lines and extending from said spacer to the open top of said container, said tabs on said spacer engaging the walls of said inserts and one of said side walls of said inserts engaging one of said end walls of said container, and a plurality of horizontally disposed, vertically spaced packaging supports in each of said packaging inserts, said packaging supports being spaced in said inserts with one support above the other, each of said packaging supports having top, bottom and side walls hingedly joined along fold lines, said packaging supports extending substantially horizontally in said packaging insert with the opposite ends of said supports in engagement with the opposite end walls of said inserts, and cut-outs in each of said supports for engaging a side of a product packaged in said container and for supporting and holding said product horizontally between said inserts spaced one above the other and out of engagement with said bottom wall of said container and from movement in said container, said tabs on said spacer engaging the lowermost of said packaging supports and spacing said lowermost packaging support therebetween and from opposite walls of said packaging insert.

2. In the combination recited in claim 1 in which one of said end walls of each of said packaging inserts is in contact with one of said side walls of said container and the said side walls of each of said packaging inserts is in contact with the other of said side walls of said container, each of said packaging insert end and side walls having an end portion folded inwardly substantially at right angle to the respective walls, said inwardly folded portions engaging a side wall of said packaging support.

3. In the combination recited in claim 2 in which said container, said packaging insert spacer, said packaging inserts and said packaging supports are paperboard.

4. In the combination recited in claim 3 in which said paperboard is corrugated.

5. In the combination recited in claim 4 in which one of said plurality of spaced packaging supports in each of said packaging inserts has slots, a packaging support spacer having tabs, said tabs extending into said slots in said packaging support, said support spacer having upwardly extending portions intermediate said cut-outs in said supports and means, on said packaging support blanks, intermediate said upwardly extending portions, for engaging and supporting the neck of a television tube in said cut-outs.

6. In combination, a container having opposed side and end walls and a bottom wall hingedly joined along vertical and horizontal fold lines and forming a rectangular receptacle closed at the bottom and open at the top, a packaging insert spacer on the bottom wall of said container extending horizontally substantially from one of said opposed side walls to the other of said side walls and from one of said opposed end walls to the other of said end walls, said spacer having projecting upwardly therefrom toward the top of said container a plurality of spacer tabs, at least one of said spacer tabs on said insert spacer being adjacent to one of said opposed end walls and another of said spacer tabs being adjacent to the other of said end walls, said tabs adjacent said opposed end walls being spaced from said end walls to form with said end walls an opening for receiving the bottom edge of a packaging insert therebetween, packaging inserts in said container having opposed side and end walls hingedly joined along fold lines and extending from said spacer to the open top of said container with one of said opposed side walls of said packaging inserts in contact with and extending along an end wall of said container, the spacer end of said one of said opposed side walls of said packaging insert being positioned between said tab adjacent said container end wall and said container end wall to hold said insert side wall in engagement with said container end wall, and a plurality of horizontally disposed, vertically spaced packaging supports in each of said packaging inserts, said packaging supports being spaced in said inserts with one support above the other, each of said packaging supports having top, bottom and side walls hingedly joined along fold lines and extending substantially horizontally in said packaging insert with the opposite ends of said supports in engagement with the opposite end walls of said inserts, each of said supports having cut-outs for engaging the sides of a product packaged in said container and for supporting and holding said product horizontally between said inserts spaced one above the other and out of engagement with said bottom wall of said container and from movement in said container said tabs on said spacer engaging the lowermost of said packaging supports and spacing said lowermost packaging support therebetween and from opposite walls of said packaging insert.

7. In the combination recited in claim 6 in which the other of said side walls of each of said packaging inserts is in contact with one of the side walls of the other of said packaging inserts, said side walls, at their spacer ends, engaging the ends of space tabs on said insert, said tabs holding said packaging insert side walls in contact with each other.

8. In the combination recited in claim 7 in which said container, said packaging insert spacer, said packaging inserts and said packaging supports are paperboard.

9. In the combination recited in claim 8 in which said paperboard is corrugated.

10. In the combination recited in claim 9 in which one of said plurality of spaced packaging supports in each of said packaging inserts has slots, a packaging support spacer having tabs, said tabs extending into said slots in said packaging support, said support spacer having upwardly extending portions intermediate said cut-outs in said supports and means, on said packaging support blanks, intermediate said upwardly extending portions, for engaging and supporting the neck of a television tube in said cut-outs.

References Cited

UNITED STATES PATENTS 3,363,753 1/1968 Taylor ______________ 206—65
3,406,819 10/1968 Brander _____________ 206—65

MARTHA L. RICE Primary Examiner

U.S. Cl. X.R.

206—65

PO-1050
(5/69)

UNITED STATES PATENT OFFICE
CERTIFICATE OF CORRECTION

Patent No. 3,494,534 Dated February 10, 1970

Inventor(s) McFarland et al.

It is certified that error appears in the above-identified patent and that said Letters Patent are hereby corrected as shown below:

Col. 1, line 70, "appreciable" should be -- appreciably --.

Col. 3, line 15, "generaly" should be -- generally --;
line 17, "generaly" should be -- generally --;
line 22, "arre" should be -- are --;
line 60, "packing" should be -- packaging --.

Col. 5, line 39, "rectanglar" should be -- rectangular --.

Col. 6, line 32, "embosesd" should be -- embossed --;
line 69, "package" should be -- packaging --.

Col. 8, line 21, "the sides" should be -- a side --.

SIGNED AND
SEALED
JUL 14 1970

(SEAL)
Attest:

Edward M. Fletcher, Jr.
Attesting Officer

WILLIAM E. SCHUYLER, JR.
Commissioner of Patents